United States Patent [19]

Hargrave et al.

[11] Patent Number: 4,638,124
[45] Date of Patent: Jan. 20, 1987

[54] KEY TELEPHONE SYSTEM WITH DISTRIBUTED CONTROL

[75] Inventors: Franklin Hargrave; Francisco A. Middleton, both of Newtown, Conn.

[73] Assignee: ITT Corporation, New York, N.Y.

[21] Appl. No.: 653,742

[22] Filed: Sep. 21, 1984

[51] Int. Cl.⁴ .............................................. H04M 9/06
[52] U.S. Cl. .................................... 379/159; 379/163; 379/164
[58] Field of Search ................. 179/99 R, 99 A, 99 E, 179/99 H, 99 LC, 99 LS, 99 M, 99 P, 18 ES, 81 R, 18 AD, 37

[56] References Cited

U.S. PATENT DOCUMENTS

| | | | |
|---|---|---|---|
| 4,188,511 | 2/1980 | Smith et al. | 179/99 A |
| 4,298,775 | 11/1981 | Buck et al. | 179/81 R |
| 4,329,543 | 5/1982 | Danford | 179/99 A |
| 4,351,987 | 9/1982 | Feil | 179/99 H |
| 4,382,163 | 5/1983 | White et al. | 179/99 LC |
| 4,383,137 | 5/1983 | Aikawa et al. | 179/18 ES |
| 4,387,274 | 6/1983 | Stein et al. | 179/81 R X |
| 4,401,847 | 8/1983 | Schneider et al. | 179/37 |
| 4,408,102 | 10/1983 | Lumpkin | 179/99 H |
| 4,453,040 | 6/1984 | Wolf et al. | 179/81 C |
| 4,490,583 | 12/1984 | Bednarz et al. | 179/99 R |
| 4,511,766 | 4/1985 | Shah | 179/99 A |

FOREIGN PATENT DOCUMENTS 2075306  11/1981  United Kingdom ............. 179/99 A

Primary Examiner—James L. Dwyer
Attorney, Agent, or Firm—Peter C. Van Der Sluys; Robert A. Hays

[57] ABSTRACT

A system is presented for accessing a plurality of central office lines, PBX, etc. by a plurality of stations and for exchanging signals between the stations. Each station is provided with a self-sufficient microprocessor which controls all the functions of the station. The microprocessors exchange control signals to indicate the status of each station and each line. A common intercom line is provided for both audio signals and control signals. Each station is assigned a unique address so that each station is able to dial up another station for intercom communication by generating the proper control signals.

Each station is also provided with a switch matrix for selectively accessing any of the lines, line status indicating means, and line holding means which is automatically released when any station accesses the held line.

36 Claims, 11 Drawing Figures

KEY TELEPHONE SYSTEM WITH DISTRIBUTED CONTROL

BACKGROUND OF THE INVENTION

1. Field of the Invention

In a multiple station intercom and telephone system the stations are interconnected through paired conductors which simultaneously handle voice communications and control functions on the intercom bus. Central office or PBX paired conductors may be connected to all telephone stations in the same order, or each telephone station may be connected so as to have a unique combination of central office or PBX lines available to the system.

2. Description of the Prior Art

Previous multiple station telephone and intercom systems (key systems) have utilized separate conductor pairs for signalling and control function isolated from any audio communications. These systems have also included a centralized control unit using either hookflashing or other signaling schemes as the data transmission medium.

In prior art systems using centralized control, expansion of the system by adding new stations required some degree of modification of the central control unit.

OBJECTIVES AND SUMMARY OF THE INVENTION

An objective of the present invention is to provide a station which can be used with a plurality of central office or PBX lines and an intercom line connected to similar stations.

Another objective is to provide a system in which conversations at different stations may be conducted in privacy.

A further objective is to provide a system which is easily expandable because each station has its own distributed control means which operates completely independently.

Another objective of the invention is to provide a system wherein the existing equipment automatically recognizes newly added stations and adapts its operation to include them.

Other objectives and advantages of the invention shall become apparent in the following description of the invention.

According to this invention, an intercom communication system comprises a plurality of telephone lines either from a central office or a PBX, an intercom line and a plurality of stations connected to said telephone lines and intercom line so that each station can access any one of selected ones of the telephone lines, or the intercom line for communications with other stations of the system. Another line may be used to transmit D.C. power to the stations, or alternately, as shall be described below, the D.C. power may be superimposed on the intercom line without interference with the control and communication signals between the stations. Each station is equipped with a microprocessor, a plurality of switches for connecting the corresponding station to one of the lines, and standard components of a subset such as a dialer, a hookswitch, a telephone network, and a handset, for dialing and transmission of audio signals with the selected line.

DESCRIPTION OF THE PREFERRED EMBODIMENT

Figure 1:
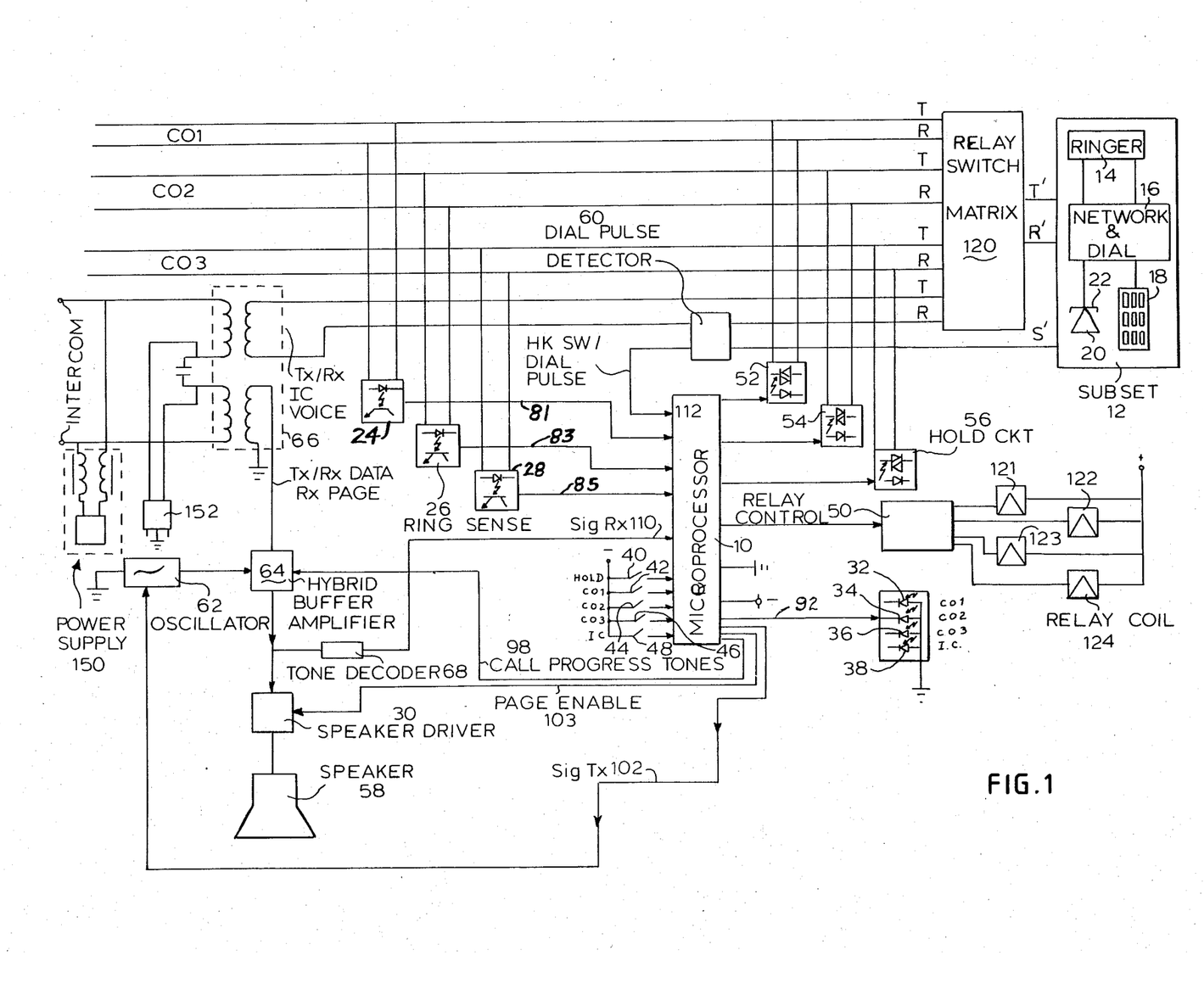
FIG. 1 is a diagram of the different elements of a station constructed in accordance with the invention.

The different elements of the invention are shown in FIG. 1. The station is connected to three central office or PBX lines, and an intercom line, designated as C.O. 1, C.O. 2, C.O. 3 and I.C. or INTERCOM respectively. The various functions of the station are controlled by a microprocessor 10, which is a standard commercially available component such as an MC 146805 manufactured by Motorola. The purpose of the microprocessor 10 is to control the connection of voice transmission equipment such as subset 12 selectively to one of the lines through switch matrix 120 as required and to perform various other control functions described more fully below. Subset 12 has essentially all the elements of a standard subset such as a ringer 14, a network and dialing element 16, a numerical pad 18, a hookswitch 20 and a handset 22. A dial pulse detection circuit 60 is interposed between subset 12 and microprocessor 10.

Incoming C.O. call:

The presence of a ringing signal on any one of the C.O. lines due to an incoming call will activate an appropriate ring sense element 24, 26 or 28 indicated on the diagram and signal the microprocessor 10 that a call is coming in. The microprocessor 10 will then send a call announce tone through the speaker drive circuit 30 to indicate an incoming call and at the same time cause the corresponding C.O. line status indicator 32, 34, 36 to flash. When the user goes off hook and presses the corresponding C.O. button 42, 44 or 46 on the front cover of a station, the microprocessor connects the subset 12 across the proper C.O. line via a switch matrix 120 which is shown in more detail in FIG. 3 and described below. Ringing is terminated by the C.O. and the corresponding status indicator is flashed by the microprocessor at a different cadence. At this time a message would be sent by the microprocessor via the I.C. bus to inform the other stations that the particular C.O. line is seized. All respective C.O. line status indicators in all stations of the system are then turned on continuously by their respective microprocessors and furthermore prevents any access to that C.O. line.

Figure 3:
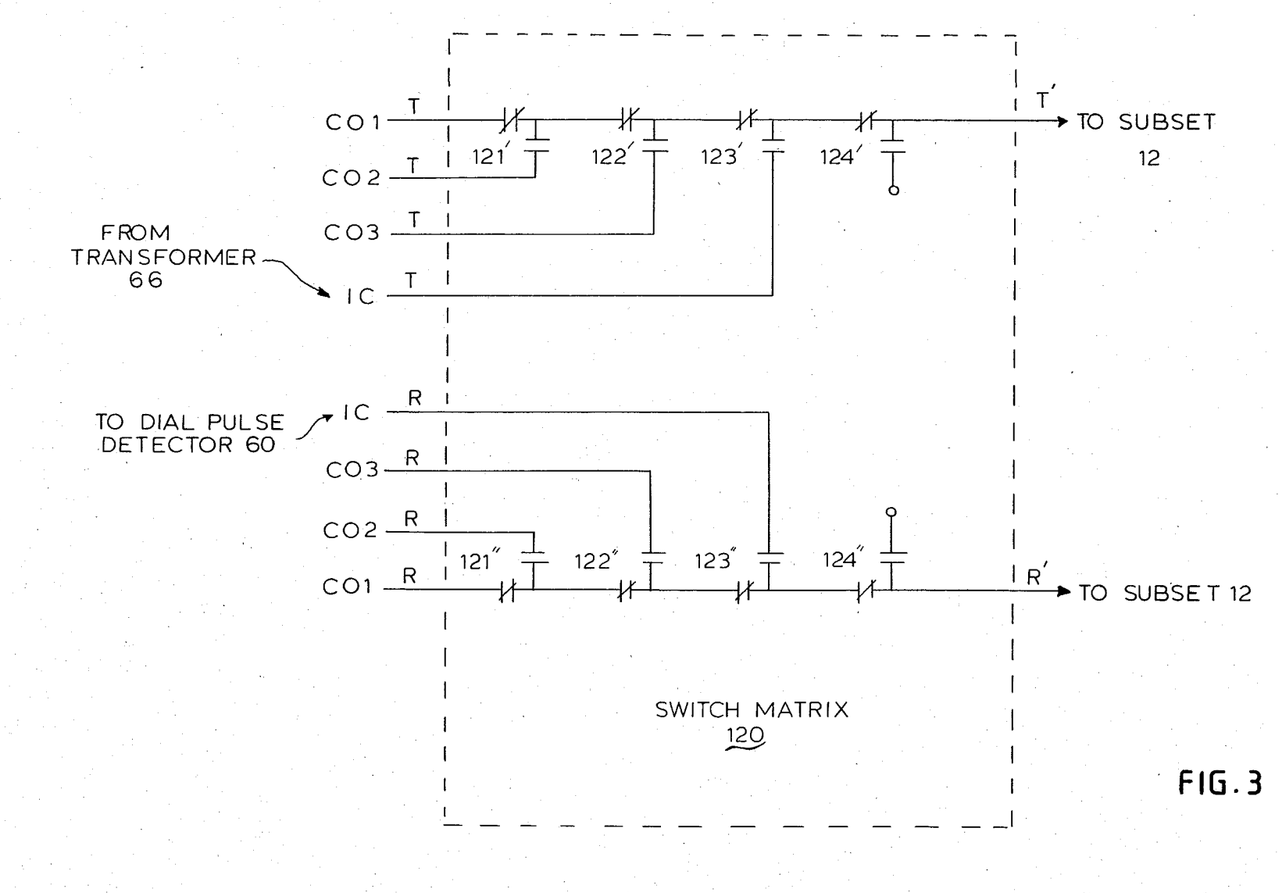
FIG. 3 shows the relay switching matrix which enables the connection to the central office and intercom lines.

The relay control circuit 50 energizes one of the relays 121, 122, 123, 124. Each of these relays is provided with two single pole double throw contracts which are connected between the central office and intercom lines, and the subset 12 as shown in FIG. 3. In this figure contacts 121' and 121" are the contacts of relay 121 and so on. It is obvious from this Figure that the TIP and RING wires from subset 12 are connected to one of the incoming lines by selectively energizing relays 121-124 as follows:

| LINE | RELAYS | | | |
|---|---|---|---|---|
|  | 121 | 122 | 123 | 124 |
| C.O. 1 | OFF | OFF | OFF | OFF |
| C.O. 2 | ON | OFF | OFF | OFF |
| C.O. 3 | X | ON | OFF | OFF |
| I.C. | X | X | ON | OFF |
| NONE | X | X | X | ON |

X = DON'T CARE

Of course it should be understood that other switch means could be used in place of relays such as solid state switches.

Outgoing C.O. Call:

To make an outgoing call on any C.O. line the user goes off hook, i.e. lifts handset 22 from hookswitch 20 and presses the desired C.O. line button 42, 44, 46 on the station, at which time the microprocessor 10 will connect the subset 12 across the selected C.O. line via the relay contacts of switch matrix 120 as described above, providing the line was not previously seized. The microprocessor 10 also activates intermittently the corresponding C.O. line status indicator 32, 34 or 36. The microprocessor 10 of the calling station sends a message to the microprocessors of the other stations via the I.C. bus indicating the seizure of the C.O. line. Line status indicators 32, 34, or 36 of the corresponding C.O. line in all other stations are similarly activated by their respective microprocessors. Dial pulses are then generated by dialer 16 in response to the buttons activated on pad 18 and are collected by the C.O. and the call is processed in the normal manner.

Hold:

Once an outside call has been completed through the central office, that C.O. line can be placed on hold by depressing the hold button 40 at the station. The microprocessor 10 will then remove the subset 12 from that line via the relay contacts of switch matrix 120 and activate an appropriate hold device 52, 54, or 56 (one per C.O. line) such as an optically coupled thyristor which maintains a proper d.c. hold current on the C.O. line and provides galvanic isolation between C.O. lines and the microprocessor. The microprocessor 10 also will cause the proper C.O. status indicators (34, 36, or 38) to flash intermittently. Further, the microprocessor 10 will cause a message to be transmitted to all other stations via the I.C. bus which will inform their microprocessors that the C.O. line has been placed in a hold state and to intermittently flash the corresponding status indicator. The hold function is automatically released when any user pushes the button (42, 44, or 46) for that C.O. line which is held at which time the microprocessor re-connects the off hook station to the specific C.O. line, dropping the hold. Going on hook terminates the call.

Transfer:

A call on any of the C.O. lines can be transferred from any station to another station of the system via the hold and intercom functions. The C.O. is placed on hold by depressing the hold button, at which time the appropriate status indicator (32, 34, or 36) for that C.O. line is flashed intermittently in all the stations via a message from the microprocessor 10 in the holding station to all other stations over the intercom line. The user wishing to make the transfer then pushes the I.C. button. The microprocessor connects the station across the I.C. circuit via the switch matrix 120 as described above. The station which is to receive the transfer is then dialed by the user making the transfer and the microprocessor sends another message to alert the other user by flashing the I.C. indicator 38 in that particular station and also generating an audible tone in the speaker 58. When the I.C. call is picked up at the receiving end, the I.C. indicator 38 is lit continuously in all the other stations via microprocessor messaging to indicate I.C. voice communication over the I.C. line. The operator at the first station announces the transfer and then hangs up. The operator at the second station pushes the button of the transferred C.O. line and the microprocessor 10 of the second station connects the subset 12 across the proper C.O. line while the subset is off hook thus releasing the hold. The call has then been successfully transferred to the receiving station. The I.C. at this time is no longer busy, and the microprocessor 10 of the second receiving station sends a message to all stations that the I.C. status indicator 38 should be turned off. The C.O. indicator will remain lit until the call is terminated by an on hook operation at the transferred set.

Intercom call:

Each station has a unique two-digit address assigned to it. The preferred embodiment may have up to 16 stations; however, this number may be varied depending upon design choice and microprocessor limitations. To make an outgoing call on the intercom circuit the user presses the I.C. button 48 before or after going off hook at which time the microprocessor 10 connects the subset across the I.C. line via the relay contacts of switch matrix 120 and sends a dial tone to the subset 12 to indicate call progress. The microprocessor 10 also sends a message to all other stations in the system that the I.C. line has been seized. These other station microprocessors will indicate this seizure by lighting indicator 38. The two digit address of the station being called is then dialed. The microprocessor 10 then terminates the dial tone and collects the dial pulses via the dial pulse detector 60 and sends a message out on the I.C. line which informs all stations of the called station address. When the called station receives the message, its microprocessor 10 will flash the I.C. indicator 38 and send an audible tone to both the speaker 58 (ring) and to the I.C. line (ring back) to alert the called user that the call is coming in and the calling user that the called station is ringing. The call is completed when the called station goes off hook and presses the I.C. button 48, at which time all call progress tones are terminated by the called station microprocessor 10. The I.C. status indicator 38 is turned on continuously at all other stations to indicate that the I.C. line is seized. This is in response to a message transmitted by the called station when the called station went off hook. Note that during voice communications over the I.C. line at this time, messages are being sent by other microprocessors in the system over the same pair of conductors.

Signalling:

Messages are sent from microprocessor to microprocessor via amplitude modulated signalling over the I.C. line pair. Voice communications occur simultaneously over these same conductors and hence the modulated signal is chosen in a frequency range well beyond the voice band. Whenever the user goes off hook or pushes any of the station buttons 40, 42, 44, 46, the station will automatically send a message over the I.C. line to inform all other stations what change has occurred in the system. The microprocessor 10 at the sending station initiates a digital pulse code message which is used to gate the high frequency output signal of a signal generator 62, on and off, to obtain 100% amplitude modulation. This amplitude modulated signal is sent through a hybrid network 64 to the signalling coil of transformer 66, and then to the I.C. line. Thus an amplitude modulated version of the original digital signal is applied to the I.C. line. Message collision is detected by feeding the transmitted signal back to the transmitting microprocessor through the Signal Receive (SIG Rx) path 110. If the fed back signal matches the transmitted signal, it is assumed that no collision has occurred. Note that message collisions are a common problem in distributed control systems where message length approaches communication channel delay and there is high signalling activity.

The amplitude modulated signal is received on the signalling coil of transformer 66, and passed through the hybrid amplifier section 64, which is bi-directional for Tx or Rx transmission, and inputted to the tone decoder 68. The tone decoder 68 reproduces the original digital code signal from the amplitude modulated high frequency signal and feeds it directly to the microprocessor's receive port. If that microprocessor happened to be transmitting a message at the same time it was receiving the message from the other microprocessor, its transmit monitor would indicate an error and a collision would be assumed. The message would then be sent again after a delay of random length. This retransmit procedure will be repeated until no collision is detected. All the stations receive information on the system's status each time a user initiates a new condition.

Paging:

Any station user can initiate an all-stations page by first accessing the intercom line as described above and, dialing a single digit such as "7" instead of the normal 2 digit station address such as "11" to "26". The microprocessor will recognize the "7" as the all station page command and will send a message to all stations via the I.C. line to activate their page enable controls 103. The paging station user simply speaks at this time into the handset 22 and his voice is transmitted to all other sets stations via the I.C. line, and is fed to speaker 58 through the hybrid amplifier circuit 64 and speaker drive circuit 30 which was previously enabled by the microprocessor 10.

Conference:

A conference call can be set up by the station user so that more than one station is connected to the same C.O. line. The station user wishing to set up the conference call would be in conversation with a party on a C.O. line and would activate the C.O. line hold as previously described. The station user then executes an I.C. call as described and dials the 2 digit station number of the station to be included in the conference. A message is sent via the I.C. line to the called station, the called party receives the audible and visual indications previously described, and answers the I.C. call. The station initiating the conference at this time announces to the called party the intention of setting up a conference and proceeds to press the hold button and then presses the appropriate C.O. line button. A message is sent to the called station over the I.C. line that a conference call is to take place on that C.O. line. This enables the called station user to join the conference by pressing the corresponding CO line button. If the conference is not desired after connection has taken place on the I.C. the station user simply presses the C.O. button to return to the held party.

A conference call can be set up by a station user so that more than one station is connected to the I.C. line. The station setting up the conference call would be in conversation with a party on the I.C. line and would press the I.C. button and dial the 2 digit station number of the station to be included in the conference. The message is then sent via the IC line to alert that station user of the I.C. call coming in. The microprocessor also alerts the system that a conference call will be set up thus cancelling I.C. privacy to that station that was dialed. The station dialed presses the intercom button, goes off hook, and joins the conference. Calling party control is in effect at this time, and if the station that initiated the conference goes on hook, all connections are released.

System Power Supply:

Each station could have its own power supply connected to an a.c. outlet for providing d.c. power to the station components. Alternatively one power supply such as 150 shown in FIG. 1 could be provided for the entire system. In such case the power from supply 150 would be distributed over the I.C. lines to each station. Each station in turn would have its own power circuit 152 connected to the I.C. line through transformer 66 for providing power to the station components.

Default operation during power failure:

In the case of failure of the d.c. power source 150 indicated on the block diagram (FIG. 1), each station will revert to the operation of a normal telephone on the C.O. priority line (C.O. line 1 on the block diagram—FIG. 1). This is accomplished by having the relay switch contacts arranged such that in the de-energized state C.O. 1 is connected to subset 12 and C.O. 2, C.O. 3 and I.C. are disconnected. All other C.O. lines and the I.C. bus are inaccessible at that time.

Figure 2:
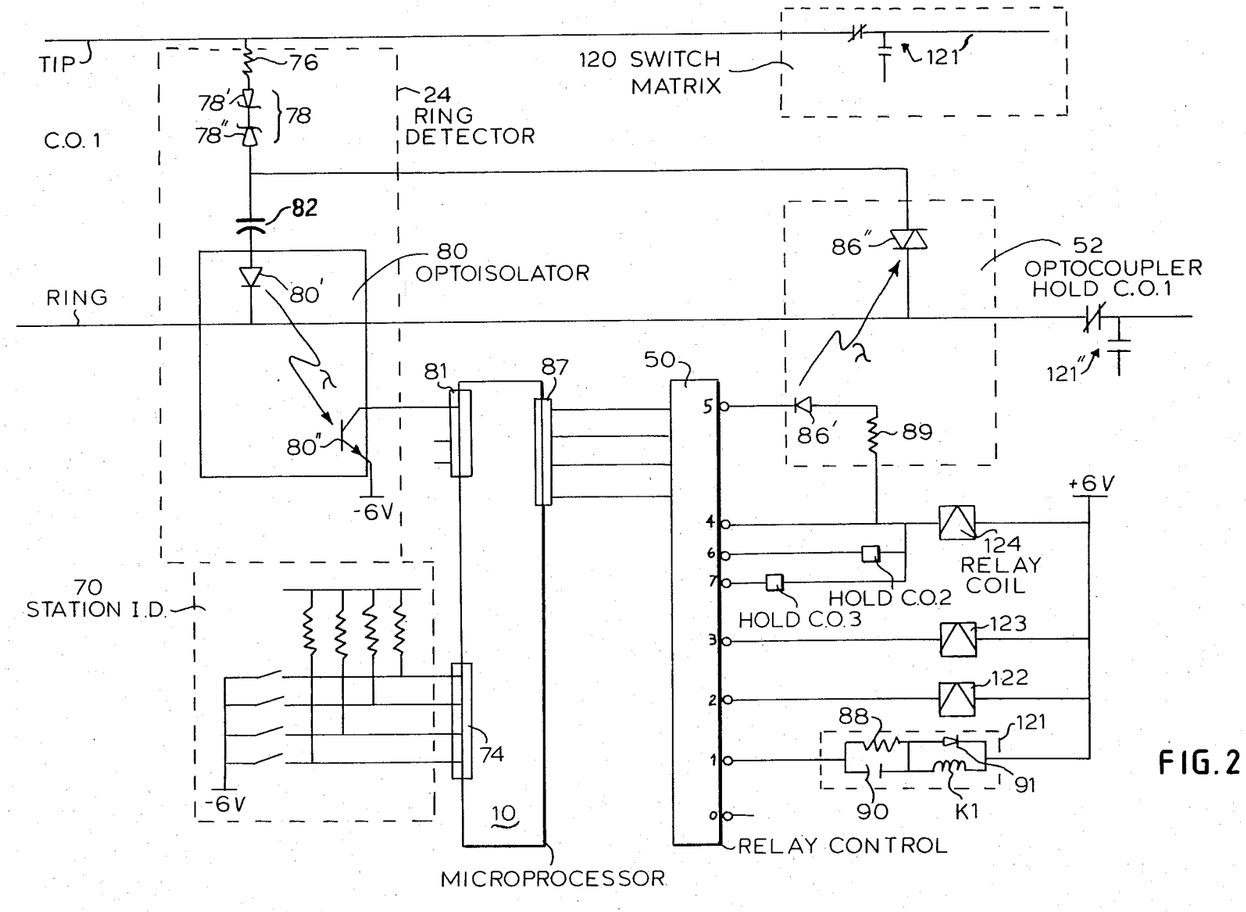
FIG. 2 shows details of the hold circuit and relay activating circuits.

Ring sense & hold circuit:

Details of the ring sense circuit 24 and C.O. 1 hold circuit 52 are shown in FIG. 2. It should be understood that the corresponding circuits for C.O. 2 and C.O. 3 are identical.

Ring Sense:

When a ringing signal from the C.O. is present on C.O. line 1, the ring current is passed through the sense circuit 24 connected across C.O. 1 line and comprising resistor 76, zener diode assembly 78, opto-isolator 80, and capacitor 82. Zener diode assembly 78 actually comprises two zener diodes 78', 78" connected back-to-back as shown. Ring current flowing through the optical diode 80' in the opto-isolator 80 causes the photo transistor 80" to conduct thus signalling an input 81 of the microprocessor 10 at the same frequency as the ring signal applied to C.O. 1. The microprocessor will then send the audible tone over line 94 (FIG. 4) and visual indication drive over 92 to speaker driver 30 and to status indicator 32 respectively, as long as signal is present on 81.

Hold:

If a conversation is in progress on C.O. line 1, that line can be placed in the hold condition by pressing the hold button 40 which signals the microprocessor to perform the hold function. Hold circuit 52 comprises an opto-coupled thyristor 86", and an LED 86' which is activated by a signal from the microprocessor 10 on output port 87 through relay control 50, as shown in FIG. 2. Simultaneously relay 124 is activated thereby removing the subset 12 from the C.O. line 1 as shown in FIG. 3. Hold circuit 52 will then provide a path for the d.c. holding current from the C.O. line 1 through resistor 76, diode 78 and thyristor 86''. Since device 52 is a photo-triac the thyristor 86 will conduct d.c. current in either direction to handle C.O. current of either polarity. The hold function will be released when any off hook telephone is connected against C.O. line 1. Since the voltage across C.O. 1 will collapse due to the low impedance of a subset, zener diode 78 will no longer conduct current hence thyristor 86'' will turn off due to lack of holding current. The microprocessor is also programmed to release the hold function after a predetermined period of time.

The ring sense and hold circuits are implemented using optoisolators and optocouplers so that galvanic isolation is provided between the central office line and the station circuitry. Other types of isolators could also be used.

Relay control:

The output 87 from the microprocessor is used to control the relays 121, 122, 123 124. Relay control 50, a BCD to decimal decoder driver such as the SN 74145 manufactured by Texas Instruments, is used to activate each of the devices. The microprocessor will output a BCD value on output ports 87 to relay control 50 which after being decoded, will pull one of the decoder outputs low. For a relay, 121 for example, output bit 1 would be pulled low, on relay control 50, causing current to flow from the 6 V power supply through the K1 coil and the limiting resistor 88 into the output stage of the relay control 50, thus turning on the relay 121. Capacitor 90 provides an initial short across the resistor 88 to insure the relay turns on fully before current limiting takes place for power conservation. Diode 91 provides a current path for the current generated by the K1 coil during turn off. Likewise for the hold functions, e.g. hold circuit 52, an output on bit 5 of relay control 50 will cause current to flow from the power supply through resistor 89 and the optical diode 86' in the opto isolator which will activate the photo-triac 86''. A unique BCD value is assigned to each state of operation of the relay control circuit 50.

System status indicators:

System status is indicated visually in each station by appropriate indicators such as LED's 32, 34, 36, 38 which are controlled by the microprocessor 10 through corresponding output ports such as 92. The microprocessor can hold an LED on continuously by pulling the corresponding bit low, or can flash an LED by pulsing the appropriate bit low.

Figure 4:
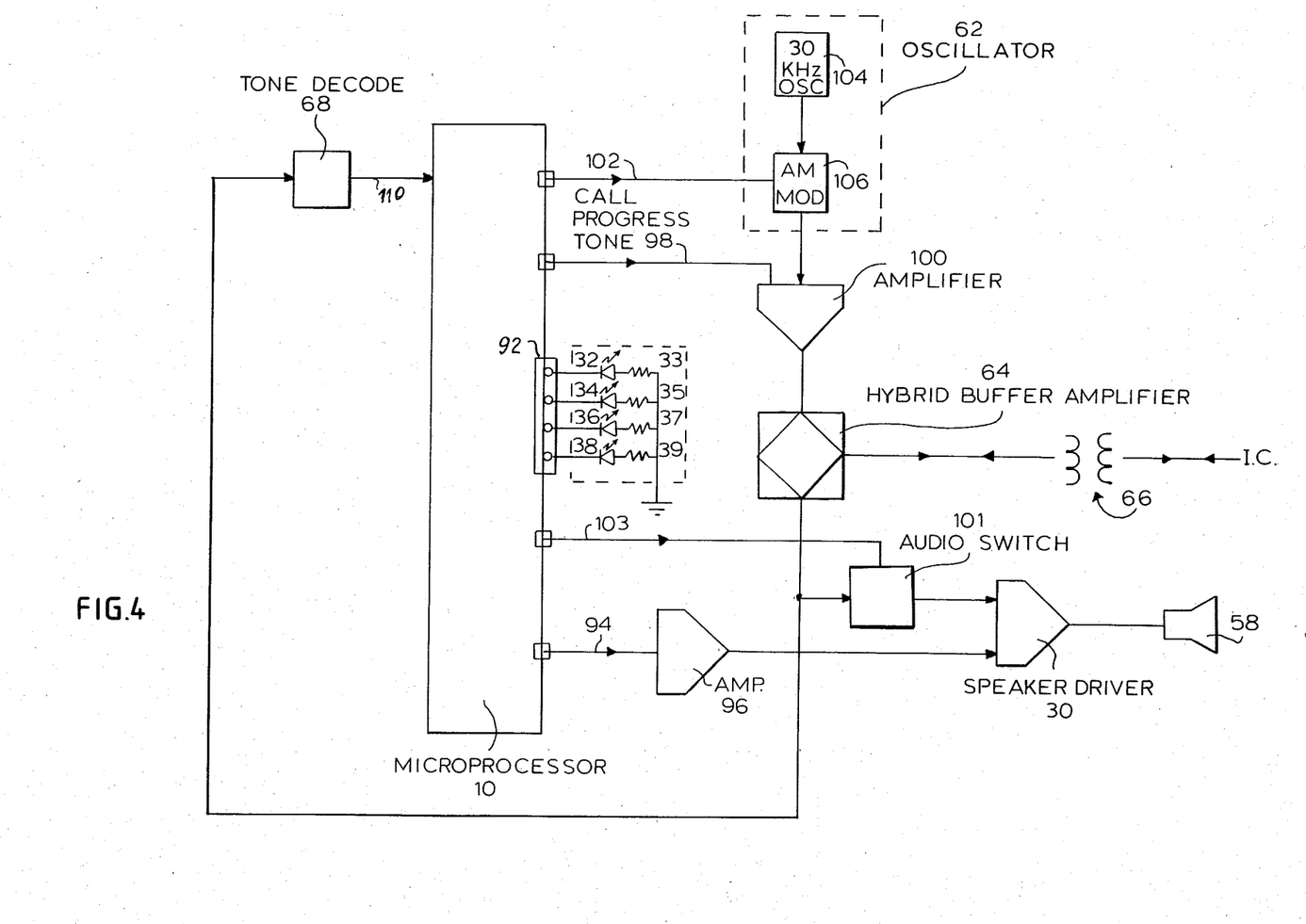
FIG. 4 shows details of the high frequency amplitude modulating control circuits.

System status indications are given audibly via the speaker 58 and/or the earpiece of the handset 22. For an incoming call announce (e.g. ring), the microprocessor generates a cadence of tone in the voice band from output port 94 which is fed into the speaker drive circuitry 30 through an amplifier 96 (FIG. 4). Different cadences of the same fundamental frequency are used to differentiate between C.O. and I.C. calls. A second output port 98 is used for call progress tones to the I.C. bus. These tones are dial tone and ring back to the calling party on the I.C line. These tones are heard in the earpiece during call set up and are input to the I.C. bus through a buffer amplifier 100 and coupled to the I.C. line via transformer 66. The telephone subset 12 is connected during a call across the second winding of transformer 66 which enables the tone to be heard in the earpiece of handset 22.

All the stations of the system are connected to the intercom line by transformer interface 66. The a.c. impedance looking into the primary core of each transformer 66 is set to 600 ohms by an impedance matching terminating network (not shown).

For paging, the telephone network is connected across the TRANSMIT coils of transformer 66 for transmitting paging audio signals from the microphone in the handset. In the receiving stations the paging signals are coupled to the speaker 58 through audio switch 101 from the hybrid 64. The switch 101 is controlled by port 103 of the microprocessor 10.

The microprocessor of a station generates a digital pulse code modulated message containing information for the control of the system via output port 102 which in turn will gate the high frequency signal from oscillator 104 onto the I.C. line as follows. Oscillator/amplifier 62 produces a carrier signal at a frequency such as 30 khz. The oscillator is free running and its output is gated by the microprocessor digital signal stream from port 102 to amplitude modulator 106 which then passes an amplitude modulated carrier signal through amplifier 100 and hybrid buffer amp 64 to the I.C. line through the transformer 66. Some of the amplitude modulated signal is allowed to pass back through the hybrid buffer amp 64 attenuated to a lower monitoring level for the tone decoder 68. The transmitting station uses this attenuated signal to check for message collisions by comparing the message sent and the message received as previously described. If they are the same, the message is assumed good. The output of the tone decoder 68 is connected to the microprocessor input port 110. The balance of the hybrid amp 64 is offset slightly for the purpose of monitoring the transmitted signal.

Station identification:

The microprocessor in each station is assigned a unique two digit address for the purpose of I.C. identification. This address set by a 4-bit BCD input to the microprocessor via input port 74 and set through a manually selectable switch 70 as shown in FIG. 2.

Figure 5:
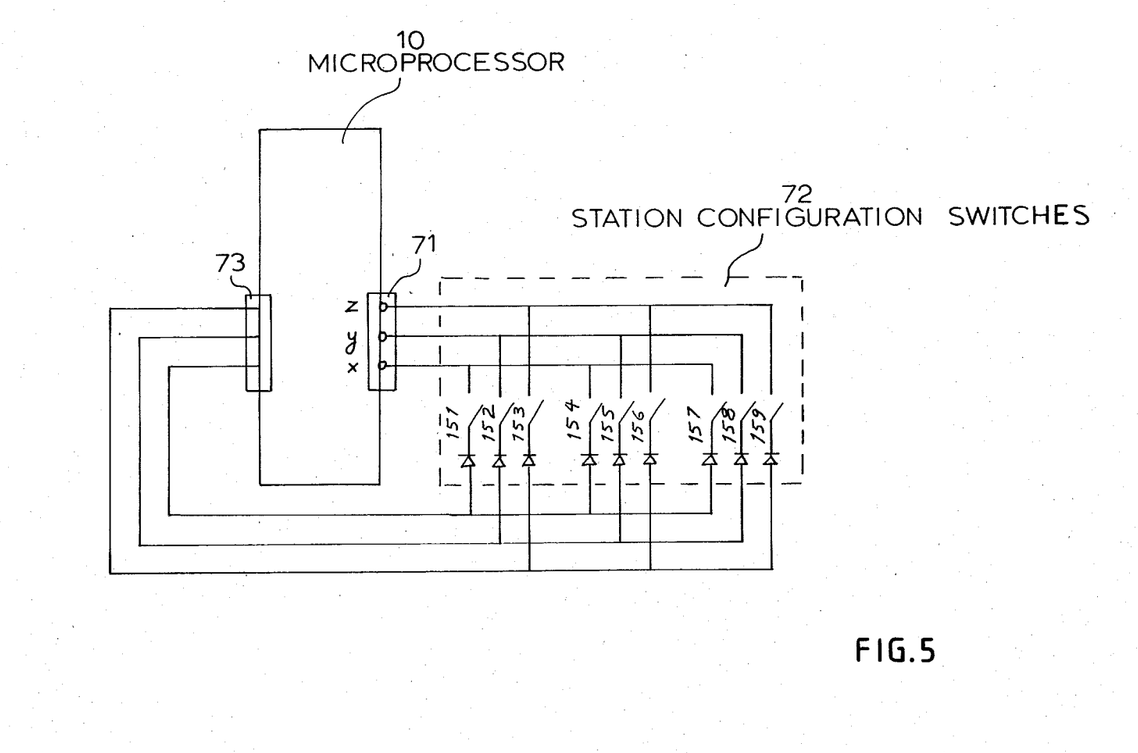
FIG. 5 shows the details of the station configuration switches.

System configuration:

Each microprocessor has to know how many C.O. lines of the network are available to the station it controls, i.e. which three of these lines are connected to this particular station, and which of these three lines is its priority line. This information is input to the microprocessor via a write/read sequence from output ports 71 and input ports 73 as shown in FIG. 5. Thus the above-mentioned system parameters (i.e. the selection of C.O. lines, and the priority line) are identified by the hardware selectable matrix switch 72.

The determination of the system parameters is as follows:

1. The microprocessor 10 outputs a code on port 71, shown in FIG. 5, corresponding to the station push button 42, 44, 46 to be correlated with one of the plurality of C.O. lines available in the network. The codes required in FIG. 5 are xyz=011 for testing matrix 72 for the C.O. line corresponding to station push button 42; xyz 101 for testing matrix 72 for the C. 0. line corresponding to push button 44 and finally xyz=110 to test button 46 for its corresponding C.O. line.

2. Assuming the current value on port 71 is xyz=011 then switches 151, 152, 153 are active and will provide a binary value from 0 through 7 to port 73 on the microprocessor 10. This value corresponds directly to the C.O. line number associated with push button switch 42.

Any action and information about the network will be transmitted on the I.C. bus using the value determined on port 73. Thus any station not having access to that particular C.O. line will not attempt to give C.O. status indication on LEDs 32, 34, 36. Furthermore, the system need not be a square system i.e. C.O. 1 need not be connected to the first tip/ring pair of a station.

The fact that the system need not be square now allows the first appearance on each station to be different—this is important since in the power fail condition the first appearance on the station is the default C.O. line.

The diodes in switch matrix 72 are the well known solution to "sneak paths" in bi-directional switch matricies.

Figure 6:
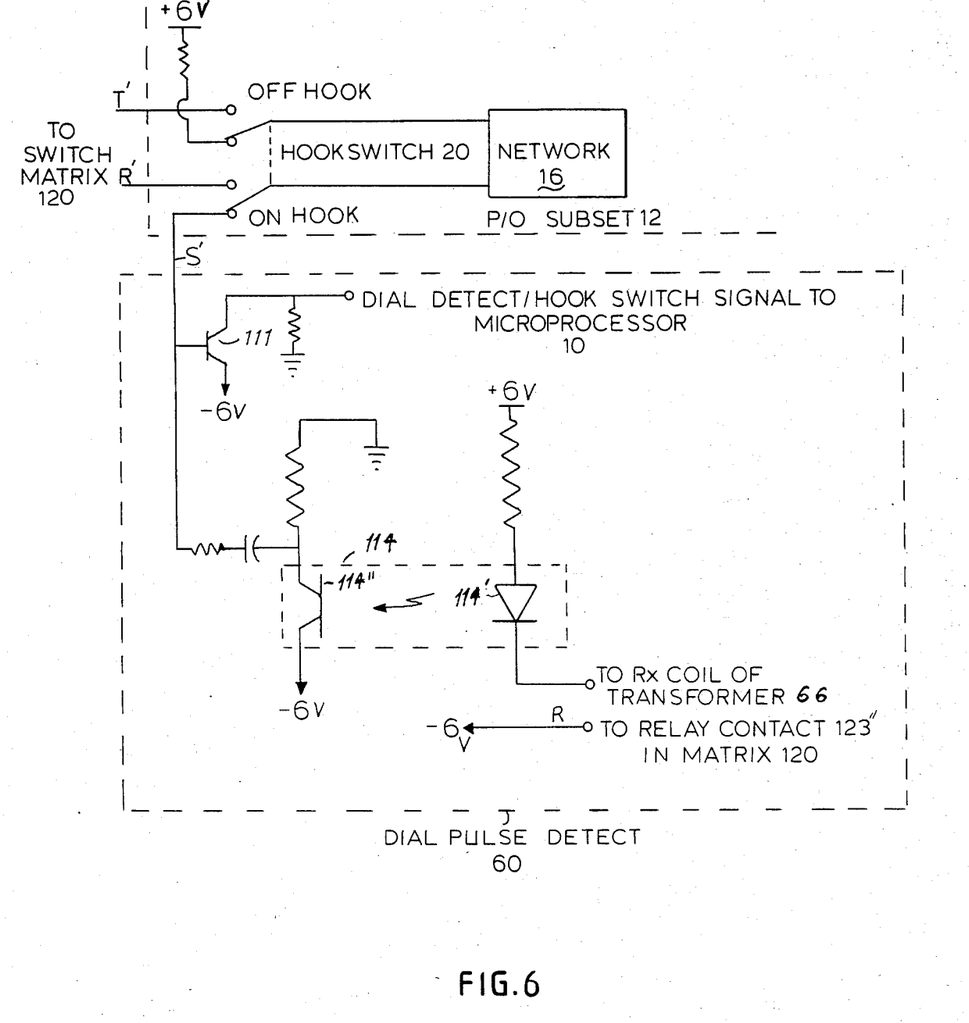
FIG. 6 shows the off-hook detection and intercom dial pulse detection circuit.

FIG. 6 shows the details of the dial pulse detection circuit 60 shown in FIG. 1. In FIG. 6 on and off hook conditions are detected by transistor 111 and are input to the microprocessor at port 112, for I.C. calls. The base of transistor 111 is connected to a source of positive potential through hookswitch 20 and network 16 when the hookswitch is "on hook". Going "off hook" is detected by transistor 111 to provide a signal to microprocessor 10.

Dial pulses on a C.O. line call will be collected by the C.O. but for intercom calls a dial pulse detection circuit is needed. This is accomplished by inserting an additional optical isolator 114 with its optical diode 114" connected between the Rx coil of the transformer 66 and a positive potential as shown in FIG. 6. The optical diode is effectively in series with the telephone subset during I.C. calls and the current pulses generated by the dialer are sensed by the optical diode 114' of isolator 114, causing the phototransistor 114" of isolator 114 to conduct, thereby coupling these pulses to the base of the hook switch detect transistor 111. Thus, the same input port 112 on the microprocessor 10, is used for pulse collection on I.C. calls and hook switch detection.

Figure 7A:
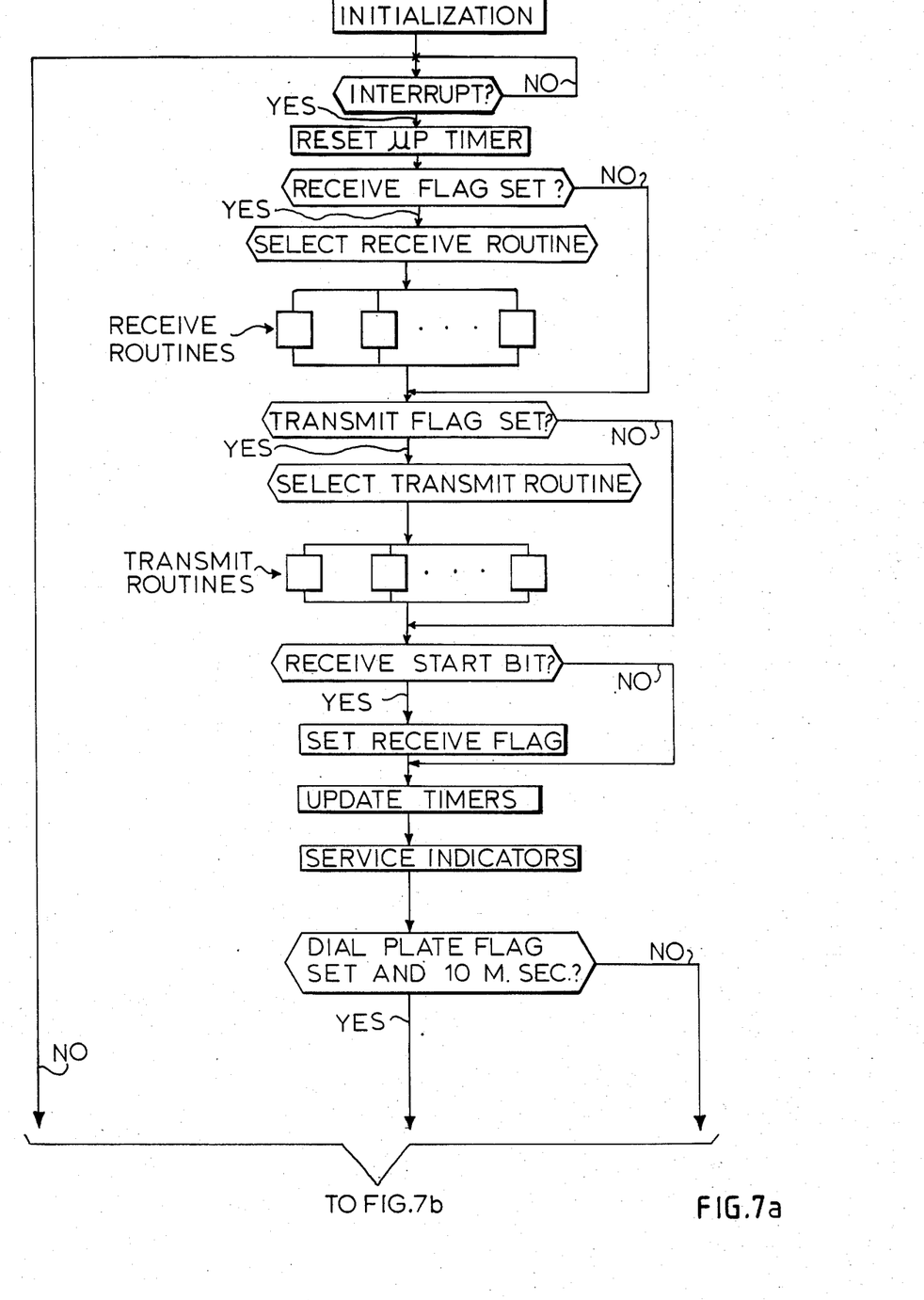
FIGS. 7a and 7b show a flow chart for the program in the microprocessor.
Figure 7B:
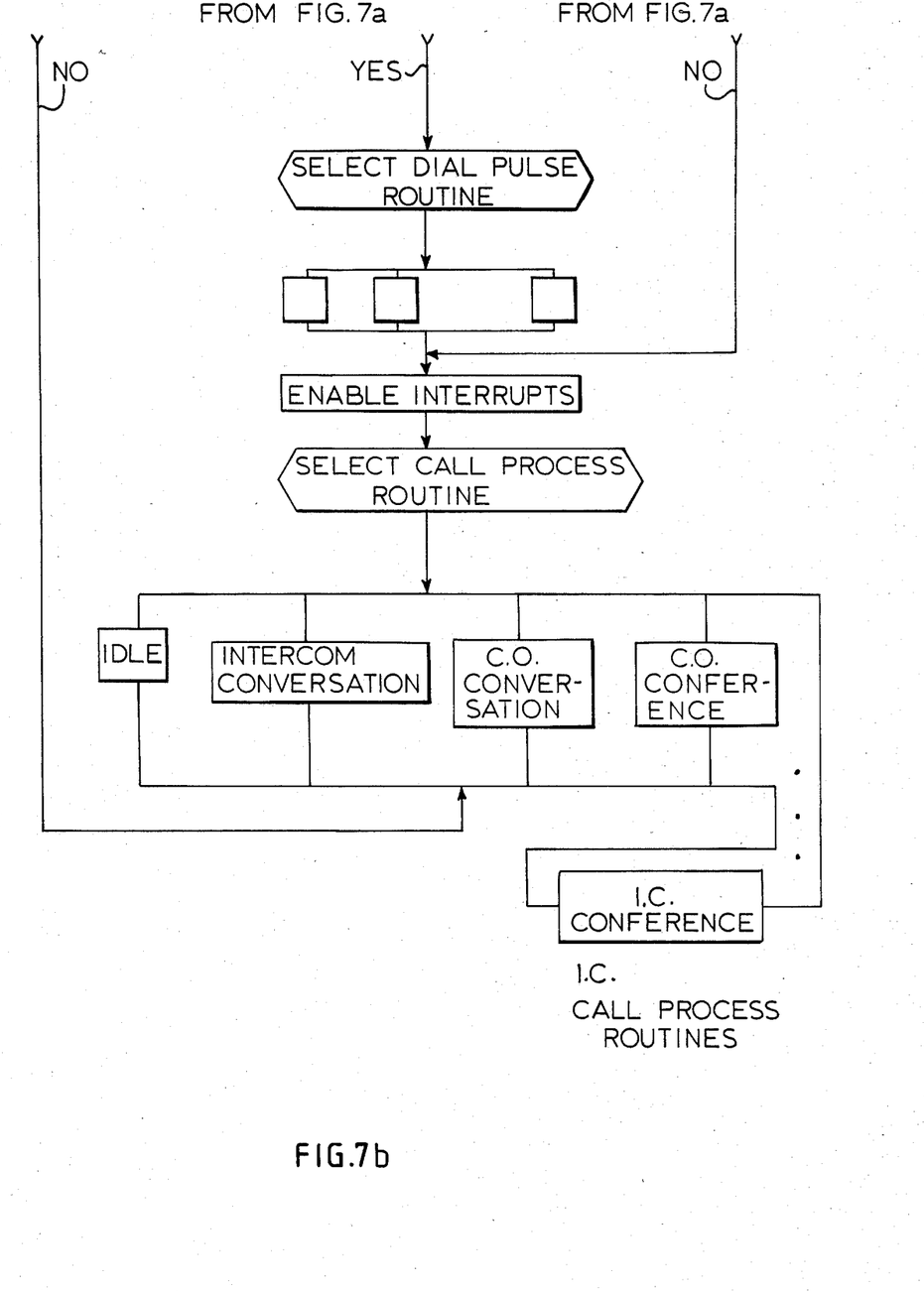

The functions of the station control are summarized in flow chart of FIGS. 7a and b.

The multiple station intercom telephone system functions under the control of the stored program which resides in the memory of each microprocessor 10 in each station. The stored program in all stations is the same. In addition to the static memory which holds the stored program, each station contains dynamic memory which holds system configuration and status.

Previous art of multiple station telephone systems has utilized centralized control and shared memory. In this invention, the control program resides in each station. The program controls the processing of calls, visual and audio indicators which correspond to the status of the calls and the transmission reception and translation of messages which indicate changes in the status of the system. Each station maintains complete system status in its own memory.

The initialization routine clears the dynamic memory, sets up the ports of the microprocessor, initializes system counters to their base value and initializes an interval time clock which resides in each microprocessor. The interval time clock is used to generate a periodic interrupt which is the base counter for the system counters and timing for transmission and reception of messages.

When an interrupt is received from the interval timer, the program will determine if a message is in the process of being received by monitoring the receive port 110. If a message is being received at port 110 the program will select the appropriate receiving subroutine and execute it. If no message is being received, the program will examine flags in the dynamic memory to see if a message has to be transmitted. If a message is being transmitted at port 102, the program will select the appropriate transmit subroutine and execute it. If a station is transmitting a message it also monitors its own message at input port 110 of the microprocessor while it is transmitting. Each of the receive and transmit subroutines receive and transmit a portion of the message during each interrupt period.

After one of the receive or transmit subroutines have been executed, the program proceeds to update system times in the dynamic memory. These timers are used to cadence acoustic 98 and visual 92 indicators for the station, time the collection of dial pulses from the dialer in the subset 12 and to monitor the inputs from the buttons 40, 42, 44, 46, 48 on each station. Before interrupts are enabled, the control program will check to see if dial pulses need to be collected by monitoring port 112 of the microprocessor and will execute that routine if called for. When the dial pulse collection task is complete, the program enables interrupts.

During the time remaining before the next periodic interrupt, the program executes routines to detect ring from any of the three central office lines 81, 83, 85 and set corresponding flags in dynamic memory and read flags which may have been set by call progress routines and the routines which translate messages sent and received. The flags may indicate the need to service the call progress visual and audio indicators. At this time the program will also cadence the ringing at port 98 and the LED's at port 92 according to the setting of those flags. The control program will cause the cadencing of LED's and ringing for both the C.O. and I.C. lines.

After servicing the call progress indicators, the program will select the appropriate call progress state and execute that routine. The call progress states use inputs to the microprocessor from the station buttons, 40, 42, 44, 46, 48, the hookswitch 20, the dial pulser 60 and messages received 110 from other subsets. It is the function of the call progress routines to read these status indicators, set flags in dynamic memory, set up messages to be transmitted and alter the pointers to the individual call progress routines. The operation of relays 121, 122, 123, 124 to select central lines, intercom and hold is executed by code in the message translation sections of the transmit and receive routines as well as in the call progress routines. The call progress routines enable the user to make C.O. calls, I.C. calls, C.O. conference and I.C. conference calls, to transfer calls, put calls on hold and to page. Each call progress routine represents a state of the call progress. A call progress routine may be interrupted by the clock interrupt enabling the program to execute the interrupt service routine in order to receive and transmit messages.

Figure 8A:
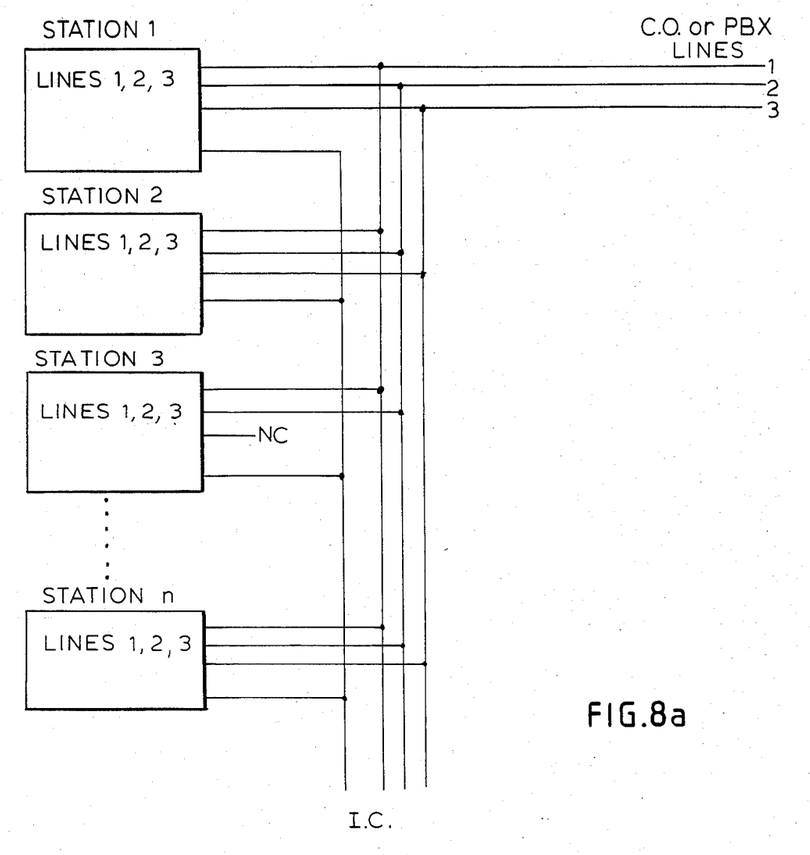
FIGS. 8a, 8b and 8c show several of the possible interconnections of individual stations to form a working system.
Figure 8B:
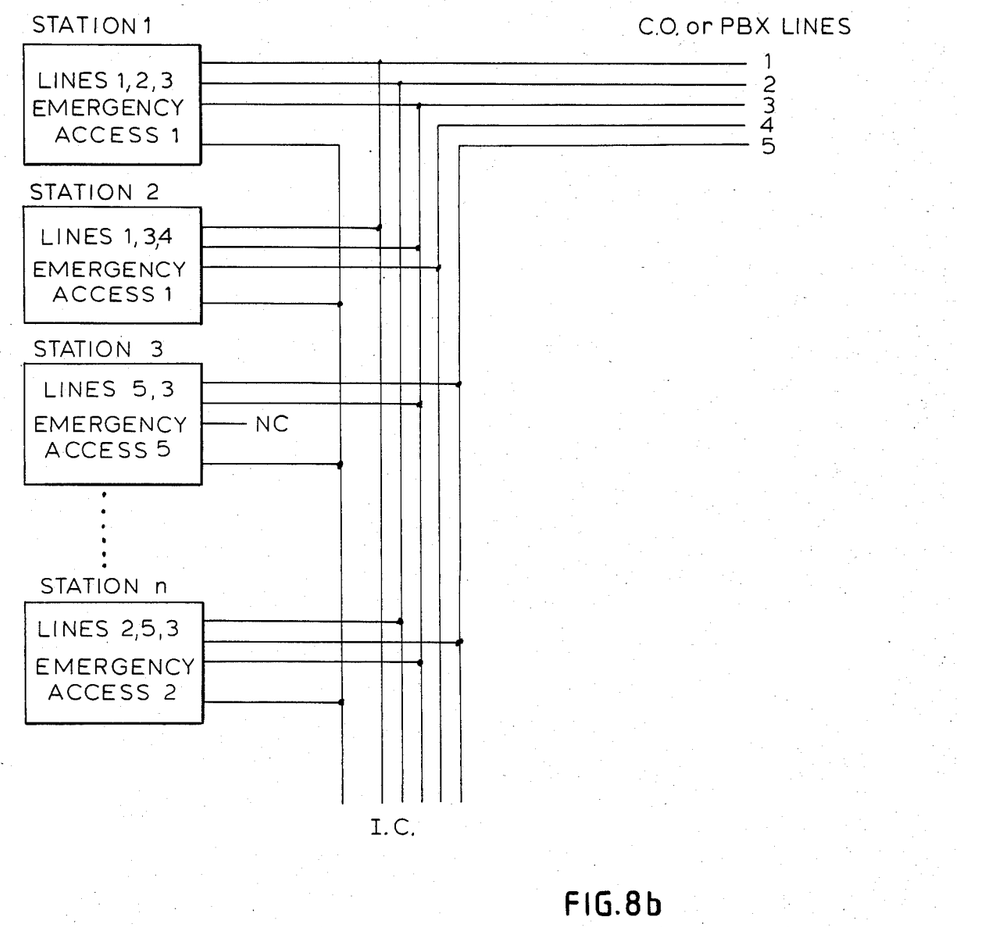
Figure 8C:
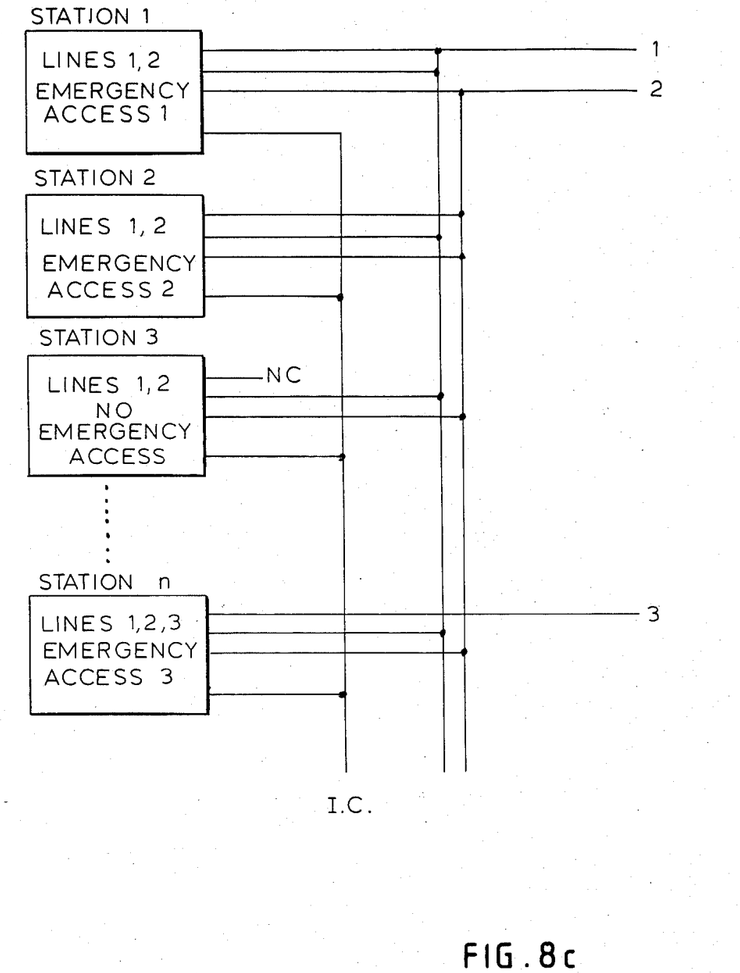

FIGS. 8a, 8b and 8c give some of the possible interconnections of multiple stations to form a communication system. FIG. 8a shows the simplest interconnection—a square system involving up to 15 stations, 3 C.O. or PBX lines and 1 Intercom line. In the even of power failure all telephones in this configuration have emergency access to only line 1.

FIG. 8b is more complex in nature being a non-square system. In this configuration any 3 of 5 C.O. or PBX lines are connected to a station. In the event of power failure all external lines may be made accessible by at least one station.

FIG. 8c is essentially the same as described in 8a, that is, the system is essentially a square system, however, only 2 external lines (C.O. or PBX) are available to all stations. The remaining 3 external lies are connected to only one station and to the power fail default position of that station. This arrangement gives access to all lines in the event of power failure and simultaneously satisfies the legal requirement in some countries (Italy for example) to have only one user connected to the line when the line is in use.

Numerous modifications to the system may be made without departing from the scope of the invention as defined in the appended claims.

We claim:

1. A communication system, comprising:
   an intercom line;
   a plurality of stations, each station connected to said intercom line and a plurality of telephone lines, said stations each including, means for transmitting and receiving information, switch means for selectively accessing said transmitting and receiving means to one of said telephone lines and intercom line, and control means for generating and receiving control signals and for controlling said switch means, said control means of each station being adapted to generate binary control signals, and each station further comprises means for converting said binary signals to PCM control signals; and
   means for exchanging said control signals between stations, whereby the system is distributively controlled by said control means in each station and there is no need for centralized control.

2. The system of claim 1 further comprising indicating means for indicating the status of each line.

3. The station of claim 1 wherein said PCM control signals have a range outside the audio range.

4. The system of claim 1 wherein said means for exchanging said control signals between stations includes means for transmitting said control signals over said intercom line.

5. The system of claim 4 wherein said control signals are transmitted to all other stations and each station functions as required by the control signals.

6. The system of claim 1 wherein said control signals are exchanged with all other stations, each station functioning in response to the received control signals.

7. The system of claim 1 wherein said means for transmitting and receiving information comprises a telephone subset.

8. The system of claim 7 wherein each station is assigned a unique address and wherein said control means is adapted to call up a preselected station for intercom communication by generating an intercom control signal corresponding to the address of the selected station.

9. The system of claim 8 wherein the control means is adapted to receive intercom control signals and to recognize the intercom control signal corresponding to the unique address of the station of which it is a part.

10. The system of claim 9 wherein each station comprises ringing means and said control means is adapted to access said telephone subset to said intercom line when the intercom control signal corresponding to the respective station address is received.

11. The system of claim 1 wherein each station further comprises paging means controlled by said control means, said paging means being adapted to reproduce paging signals generated by a station.

12. The system of claim 7 wherein each station comprises sensing means for sensing a ringing signal on a telephone line said sensing means being operatively connected to said control means, said control means being adapted to selectively access the subset to the telephone line on which the ringing signal was received.

13. The system of claim 1 wherein the information transmitted and received is an audio range.

14. A station for selectively exchanging signals on several telephone lines and an intercom line, comprising:
   a telephone subset;
   a microprocessor;
   switch means for selectively accessing said telephone subset to said telephone and intercom lines, said switch means being activated by said microprocessor; and
   control means operatively connected to said switch means and said microprocessor for selectively controlling said switch means, said microprocessor generating BCD signals and said control means comprises a BCD to decimal decoder.

15. The station of claim 14 wherein said subset comprises a dial means for generating dialing signals, a dial means activating means, and a handset for reproducing signals from and generating signals for said lines.

16. The station of claim 14 further comprising ring sensing means operatively connected between said lines and said microprocessor for sensing ringing signals and a means which is activated by said microprocessor in response to said ringing signals for producing an audio ringing signal.

17. The station of claim 16 wherein said ring sensing means comprise optical isolator means.

18. The station of claim 14 further comprising visual line status indicating means operatively connected to said microprocessor to indicate the presence of activity on said lines.

19. The station of claim 18 herein said line status indicator means comprises a plurality of light emitting devices, each device corresponding to one of the lines.

20. The station of claim 19 wherein said microprocessor is adapted to activate intermittently the corresponding indicator means, when a ringing signal is received on a line.

21. The station of claim 19 wherein said microprocessor is adapted to activate continuously the corresponding indicator device when said subset accesses one of the said lines.

22. The station of claim 14 wherein said microprocessor is adapted to release said holding means when the respective held line has been accessed by any station.

23. The station of claim 22 wherein said holding means comprises optical isolator means.

24. The station of claim 14 wherein said switch means are arranged to connect said subset to a preselected telephone line in case of power failure to said station.

25. The station of claim 14 further comprising means for requesting access to one of said telephone and intercom lines operatively connected to said microprocessor to connect the subset to the corresponding line.

26. The station of claim 15 further comprising means for detecting intercom dial pulses generated by said subset.

27. The station of claim 26 wherein the microprocessor is adapted to produce intercom dial control signals corresponding to said intercom dial pulses.

28. The station of claim 16, wherein the ring sensing means galvanically isolates the microprocessor from said lines.

29. The station of claim 19, wherein the microprocessor is adapted to activate the corresponding indicator device when a line is placed on hold.

30. The station of claim 19, wherein the microprocessor is adapted to activate the corresponding indicator device when a line is being accessed by the station.

31. The station of claim 14, wherein the holding means galvanically isolates the microprocessor from said lines.

32. A station for selectively exchanging signals on several telephone lines and an intercom line, comprising:
- a telephone subset;
- a microprocessor;
- switch means for selectively accessing said telephone subset to said telephone and intercom lines, said switch means being activated by said microprocessor;
- means for exchanging intercom control signals on said intercom line; and
- station identification means, said station identification means being uniquely preselectable, and said microprocessor being adapted to recognize received intercom control means corresponding to said station identification said station further comprising announcing means operatively connected to said microprocessor to indicate when intercom control signal has been recognized.

33. The station of claim 32 wherein said announcing means comprises a speaker.

34. The station of claim 32 wherein said microprocessor is adapted to detect control signal collisions.

35. The station of claim 34 wherein said microprocessor is adapted to detect control signal collisions by comparing outgoing and incoming signals.

36. The station of claim 34 wherein the microprocessor is adapted to repeat outgoing control signals when a control signal collision is detected.

* * * * *